United States Patent
Horn et al.

(10) Patent No.: US 6,600,140 B2
(45) Date of Patent: Jul. 29, 2003

(54) CONFIGURATION WITH A COOKER AND COOKTOP WITH AN INTEGRATED WEIGHTING FUNCTION

(75) Inventors: Katrin Horn, Traunreut (DE); Dan Neumayer, Bernau (DE)

(73) Assignee: BSH Bosch und Siemens Hausgeräte GmbH, Munich (DE)

( * ) Notice: Subject to any disclaimer, the term of this patent is extended or adjusted under 35 U.S.C. 154(b) by 0 days.

(21) Appl. No.: 10/046,120

(22) Filed: Jan. 7, 2002

(65) Prior Publication Data

US 2002/0092844 A1 Jul. 18, 2002

Related U.S. Application Data

(63) Continuation of application No. PCT/EP00/06346, filed on Jul. 5, 2000.

(30) Foreign Application Priority Data

Jul. 6, 1999 (DE) .......................................... 199 31 169

(51) Int. Cl.[7] ................................................. H05B 1/02
(52) U.S. Cl. ....................... 219/518; 219/483; 219/506; 219/413; 99/325
(58) Field of Search ................................ 219/412–414, 219/453, 506, 497, 518, 492, 494, 483; 99/325–338

(56) References Cited

U.S. PATENT DOCUMENTS 4,476,946 A 10/1984 Smith

FOREIGN PATENT DOCUMENTS

| DE | 197 23 247 A1 | 12/1998 |
| GB | 2 011 677 A | 7/1979 |
| WO | WO 95/35483 | 12/1995 |

Primary Examiner—Teresa Walberg
(74) Attorney, Agent, or Firm—Laurence A. Greenberg; Werner H. Stemer; Ralph E. Locher

(57) ABSTRACT

A cooking configuration includes a cooker having at least one control unit for controlling heat output of the cooker, an operating unit and a display unit each connected to the control unit, and a cooking space. The configuration also includes a cooktop having a sensor unit for weighing articles set down on the cooktop and establishing a weight measurement and a data line connecting the cooker to the cooktop. The sensor unit is connected to the control unit and communicates the weight measurement to the control unit. The cooker or the cooktop has an operating element for transferring the weight measurement from the sensor unit to the control unit. The operating element is connected to the control unit and the sensor unit and is disposed in the cooker or the cooktop.

8 Claims, 1 Drawing Sheet

CONFIGURATION WITH A COOKER AND COOKTOP WITH AN INTEGRATED WEIGHTING FUNCTION

CROSS-REFERENCE TO RELATED APPLICATION

This application is a continuation of copending International Application No. PCT/EP00/06346, filed Jul. 5, 2000, which designated the United States.

BACKGROUND OF THE INVENTION

Field of the Invention

The invention lies in the field of appliances. The invention relates to a configuration with a cooker with a cooking space and with a cooktop that are connected to one another at least through a data line, and with an operating unit and a display unit and with at least one control unit of the cooker for controlling the heat output of the cooker.

Such a configuration is disclosed in German Published, Non-Prosecuted Patent Application DE 197 23 247 A1. The application describes a switching and regulating interface that is located between the cooker and cooktop and by which cooktop-specific components are connected, as a plug-in module, to a compatible basic control set-up belonging to the cooker.

Furthermore, International publication WO 95/35483 discloses a cooktop with a cooktop panel, in particular, made of glass ceramic material, of which the underside has at least one heating element for heating a cooking vessel that can be set down on the cooktop panel. The cooktop has a detection unit that detects the deformation of the cooktop panel as a result of the weight-induced loading by the cooking vessel and determines the corresponding weight-induced loading. In such a case, the cooktop has an uninterrupted surface panel with at least one heatable cooking point and a frame enclosing the panel. The frame can be supported on a stationary or transportable support, for example, a conventional work top with cooktop cutout. At least one sensor is disposed on the surface panel between the surface panel and the frame or between the frame and the support. The sensor is preferably a pressure or force sensor or a displacement sensor combined with a deformable bearing part. Alternatively, it is also possible for the sensor to be a deformation sensor and to be fitted on the surface panel itself, in particular, on the underside of the surface panel in the border region of the surface panel. In the case of such a deformation sensor configuration, the low level of measuring sensitivity as a result of the low level of deformation of the cooktop panel by the dead weight of the set-down cooking vessel may prove problematic. In the case of the configuration of a pressure or force sensor in the region of the frame, a problem may also arise, in dependence on the level of accuracy required, if forces applied to the frame or the work top during the weighing operation, for example, by the user accidentally supporting himself/herself thereon, act as not inconsiderable and non-correctable disturbance variables. It may also be problematic that the cooktop is to have a particularly high level of sealing against penetrating liquids in the region between the cooktop panel and the frame and the frame and/or the work top.

U.S. Pat. No. 4,476,946 to Smith also discloses a cooktop that movably secures a circular cooking plate in a corresponding opening of a cooktop panel. Fastened on the underside of the cooktop panel is a bending-bar configuration on which the circular cooking plate rests. The dead weight of the cooking plate results in a deflection of the bending bar, which is detected by conventional strain gauges in a bridge-circuit configuration. The weight-induced loading of the cooking plate with a cooking vessel, for example, a pot, set down thereon is detected correspondingly. In Smith, account has to be taken of both the constant permanent loading of the bending bar and, in particular, the problematic filling behavior in the encircling gap between the cooking plate and the cooktop panel with circular cutouts.

SUMMARY OF THE INVENTION

It is accordingly an object of the invention to provide a configuration with a cooker and cooktop with an integrated weighing function that overcomes the hereinafore-mentioned disadvantages of the heretofore-known devices of this general type and that further improves the possible uses of the cooker where the configuration has a cooker connecting a cooking space and a cooktop at least through a data line, an operating unit, a display unit, and at least one control unit for controlling the heat output of the cooker.

With the foregoing and other objects in view, there is provided, in accordance with the invention, a cooking configuration, including a cooker having at least one control unit for controlling heat output of the cooker, an operating unit connected to the at least one control unit, a display unit connected to the at least one control unit, and a cooking space, a cooktop having a sensor unit for weighing articles set down on the cooktop and establishing a weight measurement, the sensor unit connected to the at least one control unit and communicating the weight measurement to the at least one control unit, a data line connecting the cooker to the cooktop, and one of the group consisting of the cooker and the cooktop having an operating element for transferring the weight measurement from the sensor unit to the at least one control unit, the operating element connected to the at least one control unit and the sensor unit and disposed in one of the group consisting of the cooker and the cooktop.

In accordance with another feature of the invention, the cooker has a weight-display unit connected to the control unit.

In accordance with an added feature of the invention, the control unit controls the cooker and/or the cooktop based upon the weight measurement.

In accordance with a concomitant feature of the invention, the control unit has a processor programmed to control the cooker and/or the cooktop based upon the weight measurement.

According to the invention, the information pertaining to the weight of food that is to be cooked can be put to further use by the cooker. For example, it is possible for a display unit that is present anyway in the cooker to be used for displaying the weight of the food that is to be cooked. It is also possible for the weight-specific information to be transferred to control programs of an automatic programmer. Thus, it is possible to dispense with the laborious operation of inputting the weight value manually. It is further advantageous that the operating and display units that are present anyway on the cooker can be used for operating the sensor unit in a straightforward and error-free manner. The transfer of the measured value from the cooktop to the cooker can take place in a line-based manner or, for example, through a radio link or a contactlessly operating optical interface.

According to a preferred embodiment, a suitable operating element or a specific operating sequence is provided for the controlled transfer of the weighing result to the control unit.

Other features that are considered as characteristic for the invention are set forth in the appended claims.

Although the invention is illustrated and described herein as embodied in a configuration with a cooker and cooktop with an integrated weighing function, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
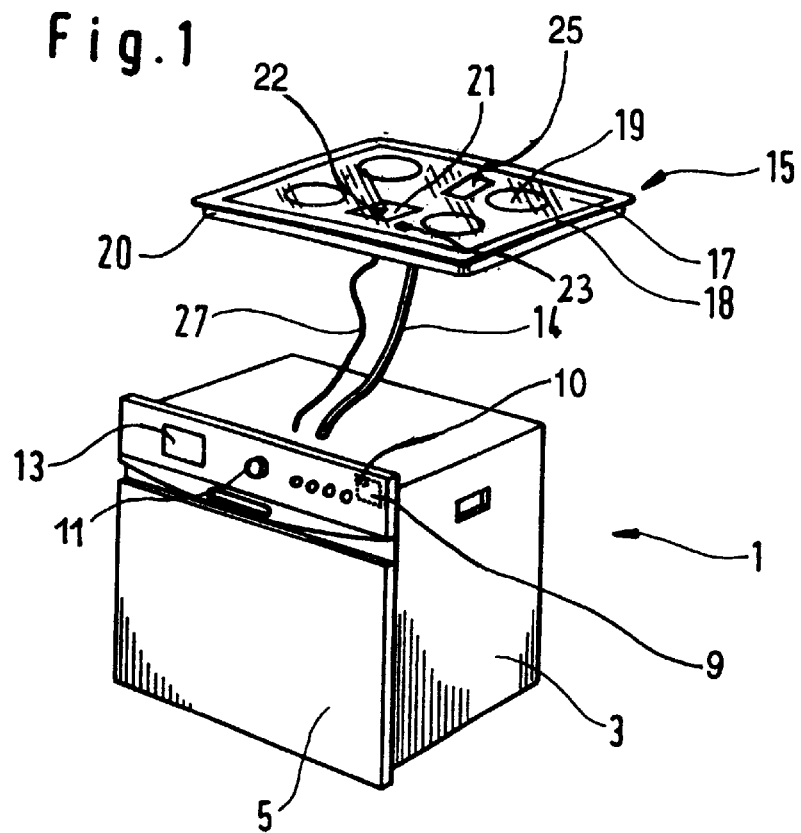
FIG. 1 is a perspective view of an oven and a cooktop with weighing unit connected thereto according to the invention.

Referring now to the figures of the drawings in detail and first, particularly to FIG. 1 thereof, there is shown an oven or built-in cooker 1 having, in a conventional manner, a metallic housing 3 and an oven door 5 on the front side of the housing 3. The door 5 closes the front of the cooking space of an oven muffle, in which food that is to be cooked can be placed, for example, on a carrier for such food. The oven muffle has thermal insulation and heating elements. An electronic control unit 9 of the oven controls the heat output and the procedure of the cooking processes in the oven in a conventional manner. Above the door 5, the oven 1 has a cooker panel behind which, or on which, conventional operating elements 11 and a display unit 13 are secured. A cooktop 15 is connected to the built-in cooker 1 through an electric connecting line 14. The cooktop 15 has a planar glass or glass ceramic panel 17 that is surrounded by a frame 18. On the glass panel 17, decorative printing marks four cooking points 19. These cooking points 19 are to be heated by conventional, non-illustrated heating elements disposed in a cooktop housing 20. The oven control unit 9 controls the heating elements of the cooktop 15. Alternatively, however, provision may also be made for the cooktop to have a dedicated control unit. In an embodiment of the control unit 9, the control unit 9 has a microprocessor 10 for controlling the cooker 1 and/or the cooktop 15

Furthermore, a weighing zone 21 is marked on the cooktop panel 17. The cooktop 15 has a sensor unit 22 that may be configured in a conventional manner. For example, it is possible for a strain-gauge configuration to be adhesively bonded to the underside of the cooktop panel 17, the configuration evaluating, through an electronic circuit configuration, for example, a bridge circuit with downstream analog-to-digital converter, the deformation of the cooktop panel 17 as a result of food that is to be cooked being set down on the weighing zone 21. It is also possible for the sensor unit 22 to have, for example, piezo-sensors and a suitable electronic processor. In such a configuration, the parts are disposed between the cooktop panel 17 and the frame 18 or between the frame 18 and a non-illustrated work top in which the panel 15 is fitted. Accordingly, the sensor unit 22 determines the weight of the cooktop panel 17 or of the cooktop 15 plus the food set down in the weighing zone 21.

In the weighing zone 21, it is possible to weigh both a filled cooking vessel and the food without the vessel. To take account of the cooking vessel, for example, a pot or a pan, the cooktop 15 has a touch-control tare button 23. Also provided in the cooktop 15 can be specific cooktop displays 25, for example, elements for displaying residual heat or switched-on zones. The sensor unit 22 is connected to the control units 9 of the oven 1 through a serial interface 27 for digital data transmission. On embodiment of the electrical connectivity of the serial interface 27 is shown in FIG. 2.

Figure 2:
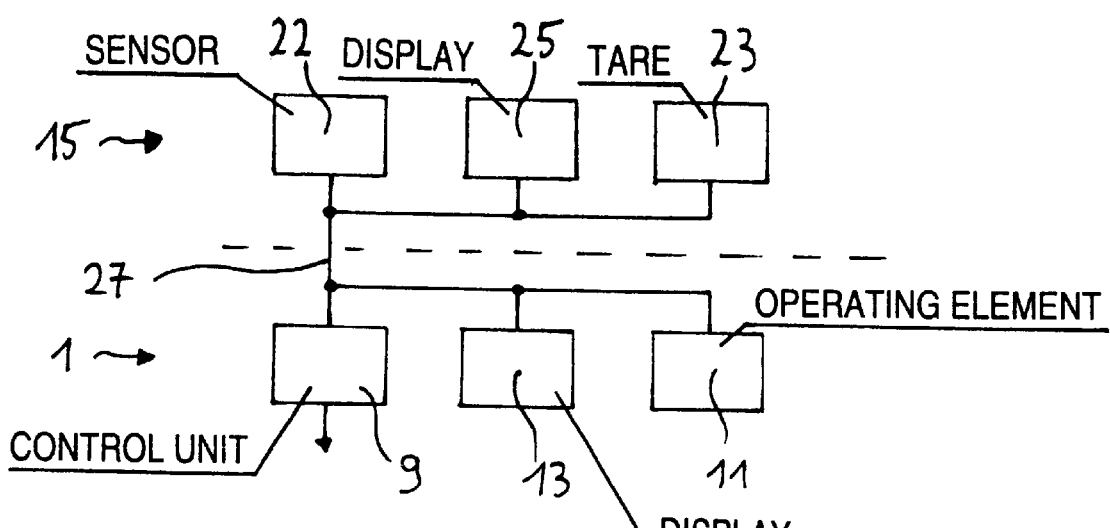
FIG. 2 is a block circuit diagram of electrical components of the configuration of FIG. 1.

In contrast to FIG. 2, it is possible for the operating elements 11, 23 and the display units 13, 25, in dependence on the switching conditions, to be connected to the control unit 9 and/or the sensor unit 22 by other, or additional, conventional connecting lines.

The configuration operates as set forth in the following text.

A user positions, for example, an empty pot on the cooktop panel 17 in the region of the weighing zone 21. The user then actuates the tare button 23 so that account can be taken of the weight of the pot in the measurement. The pot is then filled with a suitable quantity of the desired food that is to be cooked. In one embodiment, the display unit 13 of the oven 1 gives a constant indication of the weight of the food, which is determined by the sensor unit 22 and is transferred to the control unit 9 through the serial interface 27. When the user wishes to terminate the weighing operation, he/she actuates, for example, a selected operating element 11 of the oven 1. The measured value that is indicated at any given time is then transferred to a memory unit of the control unit 9. The user then positions the pot with its contents in the cooking space of the oven 1. The user selects the desired cooking mode from a multiplicity of possible programs stored in the memory unit. It is possible to dispense with the additional operation of inputting the weight of the food that is to be cooked. The user then starts the cooking process. The control unit 9 controls the cooking process in accordance with the selected cooking program and the stored food-weight value.

Communication between the cooker and the user may be further improved in that, for example, a menu-controlled weighing program may be activated by actuation of specific operating elements 11. Instructions for the user, for example, "place pot in position", "actuate tare button", "introduce food", or "put on lid", may then be given in a plain text display. It is also possible for optical or acoustic signals to ensure the correct execution, monitored for plausibility by the sensor unit 22, of the individual operating steps. If possible, to make operation easier, the operating and display elements for actuating and monitoring the weighing operation may also be provided in the cooktop.

We claim:

1. A cooking configuration, comprising:
   a cooker having:
   at least one control unit for controlling heat output of said cooker;
   an operating unit connected to said at least one control unit;
   a display unit connected to said at least one control unit; and
   a cooking space;
   a cooktop having:
   at least one cooking point;
   a weighing zone separated from said at least one cooking point; and
   a sensor unit disposed in said weighing zone for weighing articles set down on said cooktop and establishing a weight measurement;

said sensor unit connected to said at least one control unit and communicating the weight measurement to said at least one control unit;

a data line connecting said cooker to said cooktop; and one of the group consisting of said cooker and said cooktop having an operating element for transferring the weight measurement from said sensor unit to said at least one control unit, said operating element:

connected to said at least one control unit and said sensor unit; and disposed in one of the group consisting of the cooker and the cooktop.

2. The configuration according to claim 1, wherein said cooker has a weight-display unit connected to said at least one control unit.

3. The configuration according to claim 1, wherein said at least one control unit controls at least one of the group consisting of said cooker and said cooktop based upon the weight measurement.

4. The configuration according to claim 1, wherein said at least one control unit has a processor programmed to control at least one of the group consisting of said cooker and said cooktop based upon the weight measurement.

5. In a cooking configuration having a cooker, a cooktop including at least one cooking point and a weighing zone, and a data line connecting the cooker to the cooktop, the cooker defining a cooking space and having at least one control unit for controlling heat output, an operating unit connected to the at least one control unit, and a display unit connected to the at least one control unit, a weighing device comprising:

a sensor unit for weighing articles set down on the cooktop and establishing a weight measurement, said sensor unit disposed in the cooktop in the weighing zone separated from the at least one cooking point, connected to the at least one control unit, and communicating the weight measurement to the at least one control unit; and an operating element for transferring the weight measurement from said sensor unit to the at least one control unit, said operating element:

connected to the at least one control unit and said sensor unit; and disposed in one of the group consisting of the cooker and the cooktop.

6. The configuration according to claim 5, including a weight-display unit connected to the at least one control unit, said weight-display unit disposed in the cooker.

7. The configuration according to claim 5, wherein said at least one control unit controls at least one of the group consisting of said cooker and said cooktop based upon the weight measurement.

8. The configuration according to claim 5, wherein said at least one control unit has a processor programmed to control at least one of the group consisting of said cooker and said cooktop based upon the weight measurement.

* * * * *